United States Patent
Huang

(10) Patent No.: US 12,101,764 B2
(45) Date of Patent: Sep. 24, 2024

(54) UPLINK SCHEDULING METHOD AND APPARATUS, NETWORK DEVICE, AND READABLE STORAGE MEDIUM

(71) Applicant: HUAWEI TECHNOLOGIES CO., LTD., Guangdong (CN)

(72) Inventor: Hai Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 408 days.

(21) Appl. No.: 17/538,848

(22) Filed: Nov. 30, 2021

(65) Prior Publication Data

US 2022/0086878 A1 Mar. 17, 2022

Related U.S. Application Data

(63) Continuation of application No. PCT/CN2020/089338, filed on May 9, 2020.

(30) Foreign Application Priority Data

May 31, 2019 (CN) .......................... 201910470190.6

(51) Int. Cl.
*H04W 72/12* (2023.01)
*H04W 72/1268* (2023.01)
(Continued)

(52) U.S. Cl.
CPC ... *H04W 72/1268* (2013.01); *H04W 74/0833* (2013.01)

(58) Field of Classification Search
CPC ... H04W 28/04; H04W 72/04; H04W 72/042; H04W 88/08; H04W 72/1268; H04W 74/0833; H04L 5/0007
(Continued)

(56) References Cited

U.S. PATENT DOCUMENTS 11,729,834 B2 * 8/2023 Kim .................... H04W 74/006
   370/329
11,737,149 B2 * 8/2023 Jeon .................... H04W 72/23
   370/329
(Continued)

FOREIGN PATENT DOCUMENTS

CN 105722105 A 6/2016
CN 107548106 A 1/2018
(Continued)

OTHER PUBLICATIONS

3GPP TSG-RAN WG2 #92, Anaheim, US, Nov. 16-20, 2015, R2-156622, Agenda Item: 07.04.3, Source: InterDigital, Title : Remaining open issues related to Random Access. (Year: 2015).*
(Continued)

*Primary Examiner* — Peter G Solinsky
*Assistant Examiner* — Sanjay K Dewan
(74) *Attorney, Agent, or Firm* — Fish & Richardson P.C.

(57) ABSTRACT

Embodiments of this application disclose an uplink scheduling method and apparatus, a network device, and a readable storage medium. In the method provided in this application includes: The network device receives and demodulates a first signal in a first uplink resource allocated to a terminal device, if an obtained first demodulation result indicates a demodulation failure, determines, based on the first demodulation result, whether the first uplink resource carries uplink data. If it is determined that the first uplink resource carries uplink data, sends first retransmission control information to the terminal device at a first coverage level, otherwise, sends first retransmission control information to the terminal device at a second coverage level.

12 Claims, 7 Drawing Sheets

(51) Int. Cl.
   *H04W 74/08* (2024.01)
   *H04W 74/0833* (2024.01)

(58) Field of Classification Search
   USPC .......................................................... 370/329
   See application file for complete search history.

(56) References Cited

U.S. PATENT DOCUMENTS

| | | | |
|---|---|---|---|
| 2014/0133430 A1* | 5/2014 | Yang | H04W 74/0833 370/329 |
| 2014/0133443 A1* | 5/2014 | Malladi | H04W 74/002 370/329 |
| 2016/0021694 A1* | 1/2016 | Pan | H04W 4/70 370/329 |
| 2018/0176847 A1* | 6/2018 | Fasil Abdul | H04L 1/1896 |
| 2018/0359786 A1 | 12/2018 | Phuyal et al. | |
| 2021/0051732 A1* | 2/2021 | Choe | H04W 8/22 |
| 2022/0141884 A1* | 5/2022 | Lee | H04W 72/23 370/329 |
| 2022/0150846 A1* | 5/2022 | Sandberg | H04W 52/245 |
| 2023/0254905 A1* | 8/2023 | Agiwal | H04W 72/40 370/329 |

FOREIGN PATENT DOCUMENTS

| | | | | |
|---|---|---|---|---|
| CN | 107852676 A | | 3/2018 | |
| CN | 108476539 A | * | 8/2018 | ............ H04W 76/10 |
| CN | 108882381 A | | 11/2018 | |
| CN | 109392061 A | * | 2/2019 | ............ H04W 52/02 |
| CN | 109565670 A | | 4/2019 | |
| CN | 109565702 A | | 4/2019 | |
| CN | 109644079 A | | 4/2019 | |
| CN | 109804575 A | | 5/2019 | |
| CN | 3 668 190 A1 | * | 6/2020 | ............ H04W 52/02 |
| EP | 3668190 A1 | | 6/2020 | |
| JP | 0 560 339 A1 | * | 3/1993 | ............ H03M 7/40 |
| WO | 2016190711 A1 | | 12/2016 | |
| WO | 2018138382 A1 | | 8/2018 | |
| WO | 2018178249 A1 | | 10/2018 | |
| WO | 2018185640 A1 | | 10/2018 | |
| WO | WO 2019/029747 A1 | * | 2/2019 | ............ H04W 52/02 |
| WO | 2019093947 A1 | | 5/2019 | |

OTHER PUBLICATIONS

3GPP TSG RAN WG1 Meeting #92bis, Sanya, China, Apr. 16-20, 2018, R1-1804249, Agenda item: 6.2.7.1.1.2, Source: Nokia, Nokia Shanghai Bell, Title: Wake-up signal configurations and procedures. (Year: 2018).*

Extended European Search Report and Written Opinion issued in European Application No. 20813637.4 on Jun. 7, 2022, 5 pages.

Interdigital, "Remaining open issues related to Random Access," 3GPP TSG-RAN WG2 #92, , R2-156622, Anaheim, USA, Nov. 16-20, 2015, 4 pages.

Nokia, Nokia Shanghai Bell, "Wake-up signal configurations and procedures," 3GPP TSG RAN WG1 Meeting #92bis, R1-1804249, Sanya, China, Apr. 16-20, 2018, 8 pages.

Office Action issued in Chinese Application No. 201910470190.6 on Aug. 27, 2021, 13 pages (with English translation).

PCT International Search Report and Written Opinion issued in International Application No. PCT/CN2020/089338 on Aug. 12, 2020, 16 pages (with English translation).

TDIA, Starpoint, CATT, "Corrections to NB-IoT MAC test case 22.3.1.1," 3GPP TSG-RAN WG5 Meeting #76, R5-174302r1, Berlin, Germany, Aug. 21-25, 2017, 17 pages.

ZTE, "Details on PRACH repetition for MTC enhancement," 3GPP TSG RAN WG1 Meeting #80b, R1-151735, Belgrade, Serbia, Apr. 20-24, 2015, 6 pages.

* cited by examiner

UPLINK SCHEDULING METHOD AND APPARATUS, NETWORK DEVICE, AND READABLE STORAGE MEDIUM

CROSS-REFERENCE TO RELATED APPLICATIONS

This application is a continuation of International Application No. PCT/CN2020/089338, filed on May 9, 2020, which claims priority to Chinese Patent Application No. 201910470190.6, filed on May 31, 2019, The disclosures of the aforementioned applications are hereby incorporated by reference in their entireties.

TECHNICAL FIELD

This application relates to the field of communication technologies, and in particular, to an uplink scheduling method and apparatus, a network device, and a computer-readable storage medium.

BACKGROUND

A conventional mobile communication network, for example, an LTE network, is mainly used to support a communication service between people. A market demand for future home device communication and a large-scale Internet of Things deployment pose a new requirement on a mobile communication network. In other words, the mobile communication network needs to support a low-cost (low-cost) machine type communication (machine type communication, MTC) service. Different from a conventional terminal device (for example, a mobile phone, a tablet computer, or a smartwatch), most low-cost machines (or MTC terminal devices) need to be installed in an area with weak network signals. To ensure low-cost MTC, the mobile communication network needs to enhance the network coverage for the low-cost machines.

In a mobile communication network (for example, NB-IoT) that supports the low-cost MTC, when uplink data arrives, an MTC terminal device may initiate a random access procedure to request a base station to schedule an uplink resource for the MTC terminal device. After receiving an uplink scheduling grant message sent by a network device in the random access procedure, the MTC terminal device may send the uplink data by using an allocated time-frequency resource. The mobile communication network (for example, the NB-IoT) that supports the low-cost MTC generally supports coverage technologies of different coverage levels. When uplink data arrives, the MTC terminal device in a connected state at a coverage level (for ease of description, the coverage level is referred to as a first coverage level) may need to initiate a random access procedure to the network device (for example, a base station) at another coverage level (the another coverage level is referred to as a second coverage level). After sending the uplink data by using an uplink resource that is allocated by the base station to the MTC terminal device and obtained in the random access procedure, the MTC terminal device restores to monitor, at the first coverage level, a next uplink scheduling grant message sent by the base station. In the prior art, after the base station sends, to a terminal device in a random access procedure, information about an uplink resource used to send uplink data, if demodulation of a signal in the uplink resource fails, it is considered that the terminal device does not receive the information about the uplink resource. In this case, the base station sends retransmission control information to the terminal device at the second coverage level, to indicate the terminal device to resend the uplink data.

However, if the terminal device receives the information about the uplink resource sent by the base station, the terminal device restores to monitor downlink data of the base station at the first coverage level after sending the uplink data. In this case, if the demodulation performed by the base station on the signal in the uplink resource fails, the terminal device cannot detect the retransmission control information that is sent by the base station at the second coverage level, and consequently cannot resend the uplink data. As a result, uplink data transmission by the terminal device fails.

SUMMARY

Embodiments of this application provide an uplink scheduling method and apparatus, a network device, and a computer-readable storage medium, to select, based on a demodulation result, a coverage level for sending retransmission control information, to improve a success rate of sending uplink data by a terminal device. To resolve the foregoing technique problem, the embodiments of this application provide the following technical solutions.

An aspect of the embodiments of this application provides an uplink scheduling method, including: A network device receives a random access request sent by a terminal device at a second coverage level, where the terminal device is in a connected state at a first coverage level. The network device sends information about a first uplink resource to the terminal device at the second coverage level, to indicate the terminal device to send uplink data on the first uplink resource. The network device receives and demodulates a first signal in the first uplink resource, to obtain a first demodulation result. If the first demodulation result is "incorrect", the network device determines, based on the first demodulation result, whether the first uplink resource carries the uplink data. If determining that the first uplink resource carries the uplink data, the network device sends first retransmission control information to the terminal device at the first coverage level, where the first retransmission control information is used to indicate the terminal device to resend the uplink data on a second uplink resource. If determining that the first uplink resource does not carry the uplink data, the network device sends first retransmission control information to the terminal device at the second coverage level.

When the first demodulation result is "incorrect", the network device can determine, based on the first demodulation result, whether the first uplink resource carries the uplink data, and select a corresponding coverage level based on a determining result for the first retransmission. Because the coverage level corresponding to the determining result can reflect a coverage level selected by the terminal device when the terminal device monitors downlink data, it is helpful for the network device to send the first retransmission control information at the coverage level selected by the terminal device. Therefore, this helps the terminal device receive the first retransmission control information and resend the uplink data based on the first retransmission control information, thereby increasing a packet transmission success rate of the uplink data.

Optionally, that the network device determines, based on the first demodulation result, whether the first uplink resource carries the uplink data includes: determining whether signal quality of the first signal is higher than a threshold; and if it is determined that the signal quality of the first signal is higher than the threshold, determining that the first uplink resource carries the uplink data; or if it is determined that the signal quality of the first signal is lower than the threshold, determining that the first uplink resource does not carry the uplink data.

Optionally, the first coverage level corresponds to normal coverage, and the second coverage level corresponds to enhanced coverage.

Optionally, after the network device receives the random access request sent by the terminal device at the second coverage level, and before the network device sends the information about the first uplink resource to the terminal device at the second coverage level, the method further includes: The network device sends a random access response to the terminal device at the second coverage level. The network device receives, at the second coverage level, a contention message sent by the terminal device, where the contention message includes identification information of the terminal device. That the network device sends information about a first uplink resource to the terminal device at the second coverage level includes: The network device sends a contention resolution message to the terminal device at the second coverage level, where the contention resolution message includes the information about the first uplink resource.

Optionally, the method further includes: After the network device sends $(n-1)^{th}$ retransmission control information to the terminal device, the network device receives and demodulates an $n^{th}$ signal in an $n^{th}$ uplink resource to obtain an $n^{th}$ demodulation result, where the (n−1)th retransmission control information is used to indicate the terminal device to resend the uplink data on the $n^{th}$ uplink resource, and n is an integer greater than 1. If the $n^{th}$ demodulation result is "incorrect", the network device sends $n^{th}$ retransmission control information to the terminal device at the first coverage level, where the $n^{th}$ retransmission control information is used to indicate the terminal device to resend the uplink data on an $(n+1)^{th}$ uplink resource.

Optionally, the method further includes: After the network device sends $(n-1)^{th}$ retransmission control information to the terminal device, the network device receives and demodulates an $n^{th}$ signal in an $n^{th}$ uplink resource to obtain an $n^{th}$ demodulation result, where the (n−1)th retransmission control information is used to indicate the terminal device to resend the uplink data on the $n^{th}$ uplink resource, and n is an integer greater than 1. If the $n^{th}$ demodulation result is "incorrect", the network device determines whether an $(n-1)^{th}$ uplink resource carries the uplink data. If the $(n-1)^{th}$ uplink resource carries the uplink data, the network device sends $n^{th}$ retransmission control information to the terminal device at the first coverage level, where the $n^{th}$ retransmission control information is used to indicate the terminal device to resend the uplink data on an $(n+1)^{th}$ uplink resource. If the $(n-1)^{th}$ uplink resource does not carry the uplink data, the network device determines, based on the $n^{th}$ demodulation result, whether the $n^{th}$ uplink resource carries the uplink data. If the $n^{th}$ uplink resource carries the uplink data, the network device sends $n^{th}$ retransmission control information to the terminal device at the first coverage level. If the $n^{th}$ uplink resource does not carry the uplink data, the network device sends the $n^{th}$ retransmission control information to the terminal device at the second coverage level.

A second aspect of the embodiments of this application provides an uplink scheduling apparatus, including: a receiving module, configured to receive a random access request sent by a terminal device at a second coverage level, where the terminal device is in a connected state at a first coverage level; a sending module, configured to send information about a first uplink resource to the terminal device at the second coverage level, to indicate the terminal device to send uplink data on the first uplink resource, where the receiving module is further configured to receive a first signal in the first uplink resource; a demodulation module, configured to demodulate the first signal that is in the first uplink resource and that is received by the receiving module, to obtain a first demodulation result; and a determining module, configured to: when the first demodulation result obtained by the demodulation module is "incorrect", determine, based on the first demodulation result, whether the first uplink resource carries the uplink data, where the sending module is further configured to: when the determining module determines that the first uplink resource carries the uplink data, send first retransmission control information to the terminal device at the first coverage level, where the first retransmission control information is used to indicate the terminal device to resend the uplink data on a second uplink resource; or the sending module is further configured to: when the determining module determines that the first uplink resource does not carry the uplink data, send first retransmission control information to the terminal device at the second coverage level.

Optionally, the determining module is further configured to: determine whether signal quality of the first signal is higher than a threshold, and when the signal quality of the first signal is higher than the threshold, determine that the first uplink resource carries the uplink data, or when the signal quality of the first signal is lower than the threshold, determine that the first uplink resource does not carry the uplink data.

Optionally, the first coverage level corresponds to normal coverage, and the second coverage level corresponds to enhanced coverage.

Optionally, the sending module is further configured to: after the receiving module receives the random access request sent by the terminal device at the second coverage level, send a random access response to the terminal device at the second coverage level. The receiving module is further configured to receive, at the second coverage level, a contention message sent by the terminal device, where the contention message includes identification information of the terminal device. The sending module is further configured to: after the receiving module receives, at the second coverage level, the contention message sent by the terminal device, send a contention resolution message to the terminal device at the second coverage level, where the contention resolution message includes the information about the first uplink resource.

Optionally, the receiving module is further configured to: after the sending module sends $(n-1)^{th}$ retransmission control information to the terminal device, receive an $n^{th}$ signal in an $n^{th}$ uplink resource, where the $(n-1)^{th}$ retransmission control information is used to indicate the terminal device to resend the uplink data on the $n^{th}$ uplink resource, and n is an integer greater than 1. The demodulation module is further configured to: after the receiving module receives the $n^{th}$ signal, demodulate the $n^{th}$ signal to obtain an $n^{th}$ demodulation result. The sending module is further configured to: when the $n^{th}$ demodulation result obtained by the demodulation module is "incorrect", send $n^{th}$ retransmission control information to the terminal device at the first coverage level, where the $n^{th}$ retransmission control information is used to indicate the terminal device to resend the uplink data on an $(n+)^{th}$ uplink resource.

Optionally, the receiving module is further configured to: after the sending module sends $(n-1)^{th}$ retransmission control information to the terminal device, receive an $n^{th}$ signal in an $n^{th}$ uplink resource, where the $(n-1)^{th}$ retransmission control information is used to indicate the terminal device to resend the uplink data on the $n^{th}$ uplink resource, and n is an integer greater than 1. The demodulation module is further configured to: after the receiving module receives the $n^{th}$ signal, demodulate the $n^{th}$ signal to obtain an $n^{th}$ demodulation result. The determining module is further configured to: when the $n^{th}$ demodulation result obtained by the demodulation module is "incorrect", determine whether an $(n-1)^{th}$ uplink resource carries the uplink data. The sending module is further configured to: when the determining module determines that the $(n-1)^{th}$ uplink resource carries the uplink data, send $n^{th}$ retransmission control information to the terminal device at the first coverage level, where the $n^{th}$ retransmission control information is used to indicate the terminal device to resend the uplink data on an $(n+)^{th}$ uplink resource. The determining module is further configured to: when the $(n-1)^{th}$ uplink resource does not carry the uplink data, determine, based on the $n^{th}$ demodulation result, whether the $n^{th}$ uplink resource carries the uplink data. The sending module is further configured to: when the determining module determines that the $n^{th}$ uplink resource carries the uplink data, send $n^{th}$ retransmission control information to the terminal device at the first coverage level, or when the determining module determines that the $n^{th}$ uplink resource does not carry the uplink data, send the $n^{th}$ retransmission control information to the terminal device at the second coverage level.

A third aspect of the embodiments of this application provides a network device, including at least one processor, a memory, a communication line, at least one communication interface, and computer-executable instructions that are stored in the memory and that can be run on the processor, where when the computer-executable instructions are executed by the processor, the processor performs the method according to any one of the first aspect or the possible implementations of the first aspect of the embodiments of this application.

A fourth aspect of the embodiments of this application provides a computer-readable storage medium storing one or more computer-executable instructions, where when the computer-executable instructions are executed by a processor, the processor performs the method according to any one of the first aspect or the possible implementations of the first aspect of the embodiments of this application.

DESCRIPTION OF EMBODIMENTS

Figure 1:
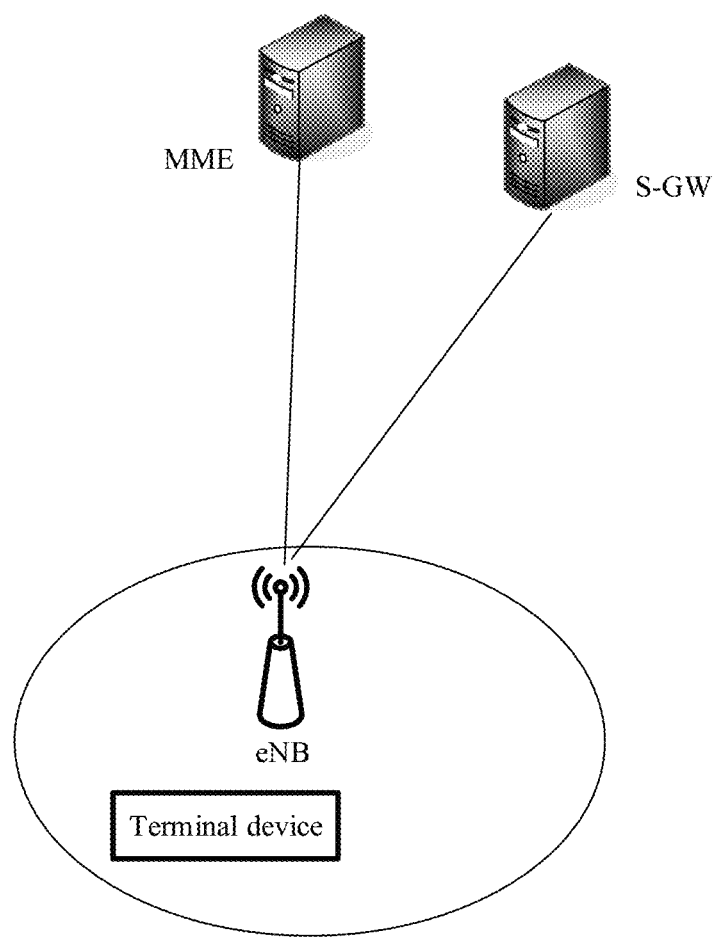
FIG. 1 is a schematic diagram of a structure of an LTE network.

A conventional mobile communication network, for example, a universal mobile telecommunications system (universal mobile telecommunications system, UMTS) network, a global system for mobile communications (global system for mobile communications, GSM) network, an LTE network, or a 5G network, is mainly used to support communication services between people. A terminal device can perform wireless communication in a mobile communication network (or a wireless communication network). The communication may be performed by using one or more core networks (core networks, CNs) and a radio access network (radio access network, RAN) that are included in the communication network. FIG. 1 is a schematic diagram of a structure of an LTE network. Refer to FIG. 1. The LTE network includes an access node, an evolved nodeB (evolved nodeB, eNB), and further includes a core network element. A mobility management entity (mobility management entity, MME) and a serving gateway (serving gateway, S-GW) are used as examples in FIG. 1. The terminal device is connected to an external network by using the eNB and the S-GW. The eNB is connected to the terminal device through a radio channel. The S-GW is a device that provides a data bearer, and generates or removes the data bearer under control of the MME. The MME manages various control functions and mobility management functions of the terminal device, and is connected to the eNB. A market demand for future home device communication and a large-scale Internet of Things deployment pose a new requirement on a mobile communication network. In other words, the mobile communication network needs to support a low-cost (low-cost) machine type communication (machine type communication, MTC) service. Low-cost MTC is a data communication service that does not require human intervention. The low-cost MTC can be used in fields such as security, tracking, payment, measurement, and digital consumption, and is related to specific applications include video surveillance, supply chain tracking, smart meters, and the like. The low-cost MTC requires low power consumption and supports low data transmission rates and low mobility.

Different from a conventional terminal device (for example, a mobile phone, a tablet computer, or a smartwatch), most low-cost machines (or referred to as MTC terminal devices) need to be installed in an area with weak network signals, for example, in basements of residential buildings, or in remote areas with sparse network devices. To ensure low-cost MTC, the mobile communication network needs to enhance the network coverage for the low-cost machines. To enhance the network coverage, a relatively feasible method is to use a coverage enhancement technology such as repeat transmission for an existing channel. Different degrees of the network coverage enhancement may be obtained when the repeat transmission is performed for different times. Whether the network coverage enhancement is required and a required degree of the network coverage enhancement mainly depend on factors such as network signal strength, a communication service type, and network resource status. These factors generally vary with changes of geographic locations and time. That is, different low-cost machines may require different degrees of the network coverage enhancement, and some low-cost machines do not even require the network coverage enhancement. A same low-cost machine may require different degrees of coverage enhancement at different moments. Therefore, the mobile communication network needs to be able to provide different degrees of the network coverage enhancement. Currently, the mobile communication network can support two coverage enhancement technologies: a coverage level 1 and a coverage level 2. A higher coverage level indicates a higher degree of the network coverage enhancement. A "coverage level 0" mentioned in the application document refers to a normal coverage technology, that is, no network coverage enhancement is performed.

Figure 2:
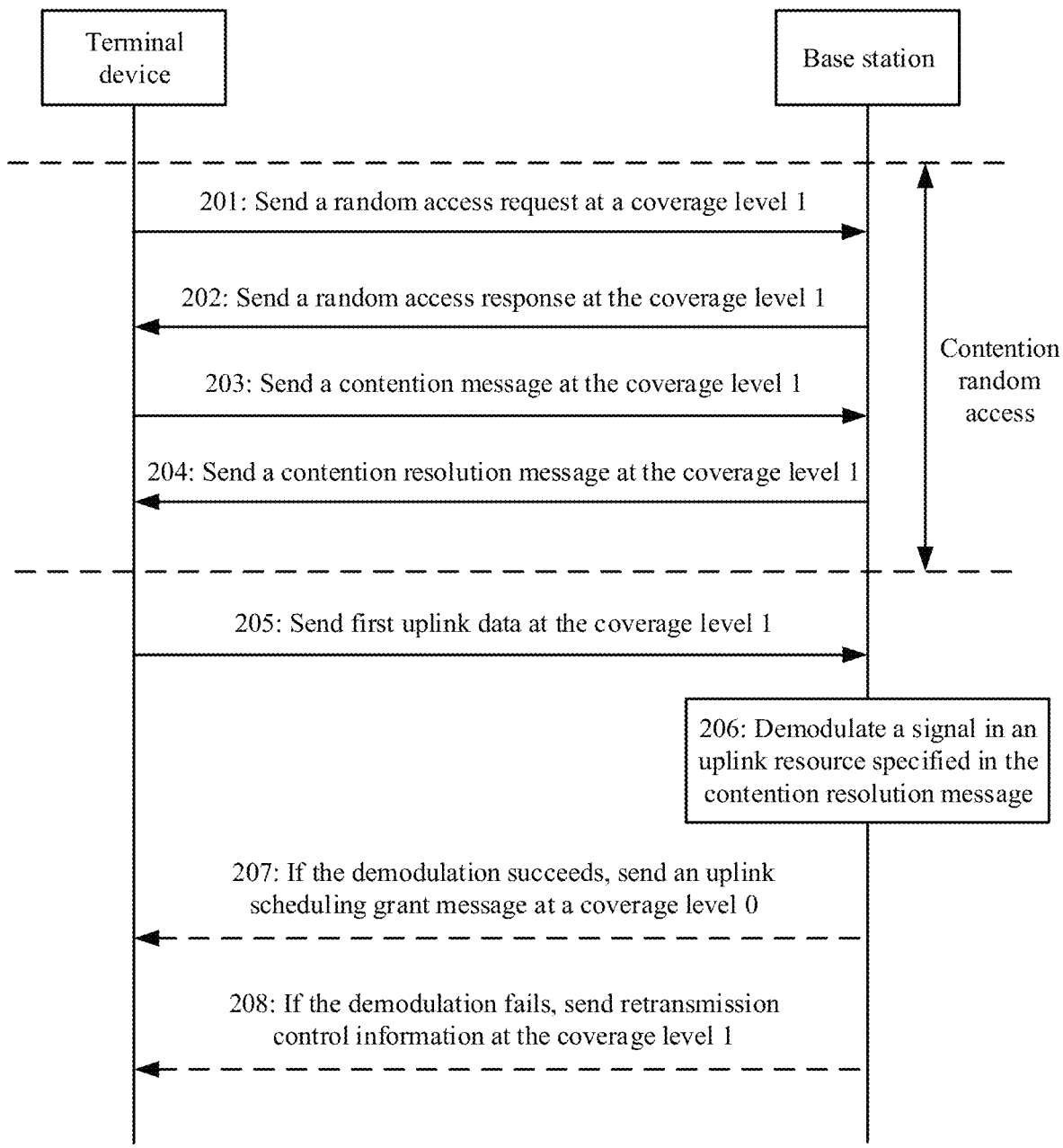
FIG. 2 is a schematic diagram of an existing uplink scheduling method.

Currently, there are two types of mobile communication networks that can support the low-cost MTC. One is that a technology supporting the low-cost MTC is introduced into a conventional mobile communication network (for example, an LTE network). The other is to provide an independent mobile communication network to support the low-cost MTC, for example, narrowband internet of things (narrowband internet of things, NB-IoT) specified by 3GPP. Although the NB-IoT is an independent communication technology, it may also be integrated with the conventional mobile communication network (such as the LTE network) in different degrees. In a mobile communication network (for example, the NB-IoT) that supports the low-cost MTC, when uplink data arrives, an MTC terminal device may initiate a random access procedure to request a base station to schedule a resource for the MTC terminal device. After receiving an uplink scheduling grant message sent by a network device in the random access procedure, the MTC terminal device may send the uplink data by using an allocated time-frequency resource. The mobile communication network (for example, the NB-IoT) that supports the low-cost MTC generally supports coverage technologies of different coverage levels. When uplink data arrives, the MTC terminal device in a connected state at a coverage level (for ease of description, the coverage level is referred to as a first coverage level) may need to initiate a random access procedure at another coverage level (the another coverage level is referred to as a second coverage level). After sending the uplink data by using a time-frequency resource obtained in the random access procedure, the MTC terminal device restores to monitor, at the first coverage level, a next uplink scheduling grant message sent by the network device. FIG. 2 is a schematic diagram of an existing uplink scheduling method. An example in which a terminal device initiates a contention random access procedure is used. Referring to FIG. 2, the existing uplink scheduling method includes the following steps.

201: The terminal device sends a random access request to a base station at a coverage level 1.

The terminal device is in a connected state at a coverage level 0. When uplink data needs to be sent, if it is detected that channel quality deteriorates, the terminal device may select a random access preamble (preamble) sequence and a PRACH resource at the coverage level 1, and send the random access request to the base station by using the PRACH resource and a Msg1. The random access request includes a selected random access preamble.

202: The base station sends a random access response to the terminal device at the coverage level 1.

After receiving the random access preamble sent by the terminal device at the coverage level 1, the base station may send the random access response to UE at the coverage level 1 by using a Msg2. The random access response includes information about an uplink resource that is scheduled for the terminal device for sending first uplink data. The uplink resource specified in the random access response is a resource at the coverage level 1.

203: The terminal device sends a contention message to the base station at the coverage level 1.

After detecting the random access response sent by the base station at the coverage level 1, the terminal device may obtain the information about the uplink resource in the random access response, and send the contention message by using the uplink resource specified in the random access response (the resource at the coverage level 1) and a Msg3. The contention message includes identification information of the terminal device, for example, a cell radio network temporary identifier (cell radio network temporary identifier, C-RNTI).

204: The base station sends a contention resolution message to the terminal device at the coverage level 1.

After receiving the contention message sent by the terminal device at the coverage level 1, the base station may send the contention resolution message to the terminal device at the coverage level 1. The contention resolution message includes the information about the uplink resource that is scheduled for the terminal device for sending the first uplink data. The uplink resource specified in the contention resolution message is the resource at the coverage level 1.

Step 201 to step 204 correspond to the contention random access procedure.

205: The terminal device sends the first uplink data to the base station at the coverage level 1.

After step 203, the terminal device monitors the contention resolution message at the coverage level 1. If the terminal device receives the contention resolution message sent by the base station at the coverage level 1, the terminal device may send the first uplink data on the uplink resource (the resource at the coverage level 1) specified in the contention resolution message.

206: The base station demodulates a signal in the uplink resource specified in the contention resolution message.

The signal in the uplink resource is a baseband signal, and a network device may demodulate the signal on the uplink resource specified in the contention resolution message.

207: If the demodulation succeeds, the base station sends an uplink scheduling grant message to the terminal device at a coverage level 0.

Because the connected state is at the coverage level 0, after step 206, if the demodulation fails, the base station sends the uplink scheduling grant message to the terminal device at the coverage level 0. The uplink scheduling grant message includes information about an uplink resource that is scheduled for the terminal device for sending second uplink data. The uplink resource specified in the uplink scheduling grant message is a resource at the coverage level 0. After step 205, the terminal device monitors the uplink scheduling grant message at the coverage level 0, to send the second uplink data on the uplink resource specified in the uplink scheduling grant message.

208: If the demodulation fails, the base station sends retransmission control information to the terminal device at the coverage level 1.

After step 204, the base station demodulates the signal in the uplink resource specified for the terminal device in the contention resolution message. If the demodulation by the base station fails, in an application scenario in which uplink ACK feedback is omitted, the base station considers that the terminal device does not send the first uplink data because the terminal device does not receive the contention resolution message. In this case, the base station sends the retransmission control information to the terminal device at the coverage level 1. The retransmission control information includes information about an uplink resource that is scheduled for the terminal device for resending the first uplink data, and is used to indicate the terminal device to resend the first uplink data on the specified uplink resource.

However, it can be learned from the foregoing description that, after step 204, if the terminal device detects the contention resolution message, after sending the first uplink data, the terminal device monitors a downlink message of the base station at the coverage level 0. In this case, the terminal device cannot detect the retransmission control information sent by the base station at the coverage level 1, and cannot resend the first uplink data by using the uplink resource specified in the retransmission control information. Consequently, the terminal device fails to transmit the uplink data. It can be learned that, in the prior art, for an MTC terminal device in a connected state at a coverage level, when uplink data arrives, if a random access procedure is initiated at another coverage level to request an uplink resource, a packet transmission success rate of the uplink data is relatively low.

To improve the packet transmission success rate of the uplink data, the embodiments of this application provide an uplink scheduling method and apparatus, a network device, and a computer-readable storage medium. A mobile communication network on which the embodiments of this application are based may be NB-IoT, or may be a conventional mobile communication network that supports low-cost MTC, for example, a UMTS network, a GSM network, an LTE network, a 5G network, or any other mobile communication network that can support both the low-cost MTC and communication services between people. A terminal device in the embodiments of this application is not limited to an MTC terminal device, for example, an electric meter, or a household appliance, and may also be a conventional terminal device that supports a coverage enhancement technology, for example, a mobile phone, a tablet computer, or a smartwatch that supports the coverage enhancement technology. A network device in the embodiments of this application is not limited to a network device specially deployed in the NB-IoT, or may be a network device in the conventional mobile communication network. The network device may be an access device, for example, an eNB in the LTE network.

Figure 3:
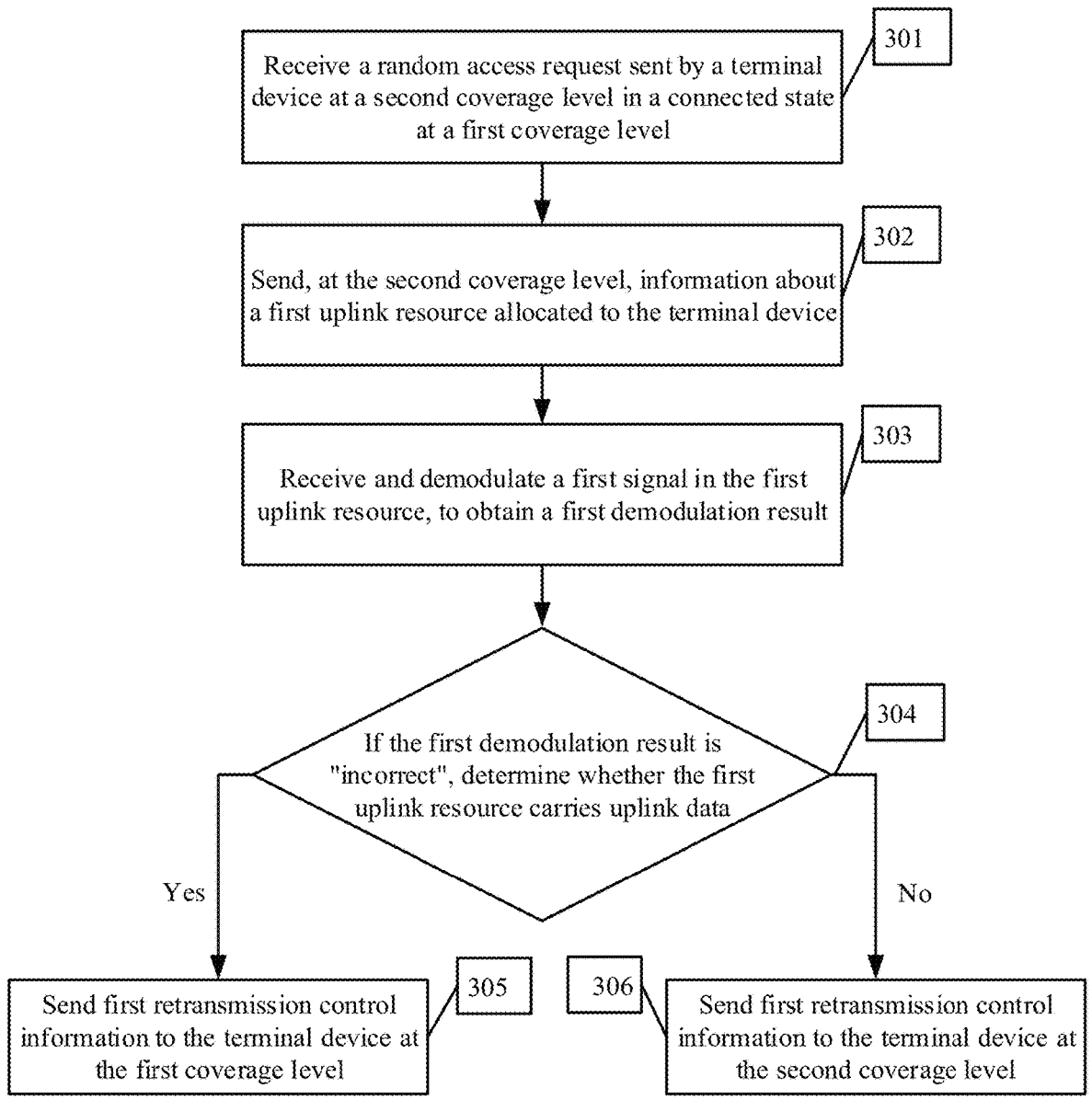
FIG. 3 is a schematic diagram of an embodiment of an uplink scheduling method according to this application.

First, the uplink scheduling method provided in the embodiments of this application is described. FIG. 3 is a schematic diagram of an embodiment of an uplink scheduling method according to this application. Referring to FIG. 3, an embodiment of the uplink scheduling method according to this application includes the following steps.

301: A network device receives a random access request sent by a terminal device at a second coverage level in a connected state at a first coverage level.

It is assumed that the terminal device is in an RRC connected state at the first coverage level. When the terminal device needs to send uplink data, the terminal device may initiate a random access procedure to request an uplink resource for sending the uplink data. If the terminal device needs to change a coverage level, for example, initiates the random access procedure at the second coverage level, or detects that channel quality deteriorates, the terminal device may send the random access request to the network device at the second coverage level. The network device can receive the random access request sent by the terminal device at the second coverage level. The random access request generally includes a random access preamble. The second coverage level is different from the first coverage level. For example, the second coverage level and the first coverage level may respectively be a coverage level 0 and a coverage level 1, a coverage level 1 and a coverage level 0, a coverage level 1 and a coverage level 2, a coverage level 2 and a coverage level 1, a coverage level 0 and a coverage level 2, or a coverage level 2 and a coverage level 0.

302: The network device sends, at the second coverage level, information about a first uplink resource allocated to the terminal device.

After receiving the random access request sent by the terminal device at the second coverage level, the network device may send, to the terminal device at the second coverage level, the information about the first uplink resource allocated to the terminal device. After detecting the information about the first uplink resource at the second coverage level, the terminal device may send the uplink data to the network device by using the first uplink resource.

303: The network device receives and demodulates a first signal in the first uplink resource to obtain a first demodulation result.

After sending the information about the first uplink resource, the network device may receive the first uplink resource, and demodulate a signal (which is referred to as the first signal for ease of description) in the first uplink resource to obtain the first demodulation result. The first demodulation result may include a demodulated first signal and signal quality of the first signal. The signal quality includes, but is not limited to, a signal-to-noise ratio and/or a signal strength.

304: If the first demodulation result is "incorrect", the network device determines, based on the first demodulation result, whether the first uplink resource carries the uplink data, and if yes, triggers step 305, or if no, triggers step 306.

If the first demodulation result is "incorrect", to determine whether the terminal device receives the information about the first uplink resource, the network device may determine, based on the first demodulation result, whether the first uplink resource carries the uplink data. If the uplink data is carried, it indicates that the terminal device receives a contention resolution message and is monitoring downlink data at the first coverage level. If it is determined that the uplink data is not carried, it indicates that the terminal device probably does not receive the contention resolution message and is monitoring the downlink data at the second coverage level. If the first demodulation result is "correct", optionally, refer to step 207. The network device sends an uplink scheduling grant message to the terminal device at the first coverage level, to indicate the terminal device to continue sending the uplink data on the specified uplink resource.

The following describes an example of a method in which the network device determines, based on the first demodulation result, whether the first uplink resource carries the uplink data. In actual application, another method may alternatively be used to determine whether the first uplink resource carries the uplink data. The method in which the network device determines, based on the first demodulation result, whether the first uplink resource carries the uplink data may include: If the signal quality of the first signal is lower than a threshold, it can be determined that the first uplink resource does not carry the uplink data. If the signal quality of the first signal is higher than the threshold, but the first demodulation result is "incorrect" due to a reason, for example, a decoding failure of the demodulated first signal, it can be determined that the first uplink resource carries the uplink data.

305: The network device sends first retransmission control information to the terminal device at the first coverage level.

If the network device determines that the first uplink resource carries the uplink data, it indicates that the terminal device receives the contention resolution message and is monitoring the downlink data at the first coverage level. In this case, the network device can send the first retransmission control information to the terminal device at the first coverage level. The first retransmission control information includes information about a second uplink resource allocated for the uplink data, and is used to indicate the terminal device to resend the uplink data on the second uplink resource.

306: The network device sends first retransmission control information to the terminal device at the second coverage level.

If the network device determines that the first uplink resource does not carry the uplink data, it indicates that the terminal device probably does not receive the contention resolution message and is monitoring the downlink data at the second coverage level. In this case, the network device can send the first retransmission control information to the terminal device at the second coverage level.

The first retransmission control information is retransmission control information sent by the network device after the first demodulation fails. The second uplink resource is an uplink resource that is allocated to the terminal device for performing the first retransmission. Because uplink resources at different coverage levels are generally different, specific content of the first retransmission control information sent by the network device at the first coverage level may be different from specific content of the first retransmission control information sent by the network device at the second coverage level.

In this embodiment of this application, when the first demodulation result is "incorrect", the network device can determine, based on the first demodulation result, whether the first uplink resource carries the uplink data, and select, based on a determining result, a corresponding coverage level for the first retransmission. Because the coverage level corresponding to the determining result can reflect a coverage level selected by the terminal device when the terminal device monitors downlink data, it is helpful for the network device to send the first retransmission control information at the coverage level selected by the terminal device. Therefore, this helps the terminal device receive the first retransmission control information and resend the uplink data based on the first retransmission control information, thereby increasing a packet transmission success rate of the uplink data.

Step 304 to step 306 correspond to a first retransmission process of the network device, and step 301 to step 302 correspond to a random access procedure. The random access procedure is generally classified into a contention random access procedure and a non-contention random access procedure. For different random access procedures, the network device may carry the information about the first uplink resource in step 302 by using different messages.

Figure 4:
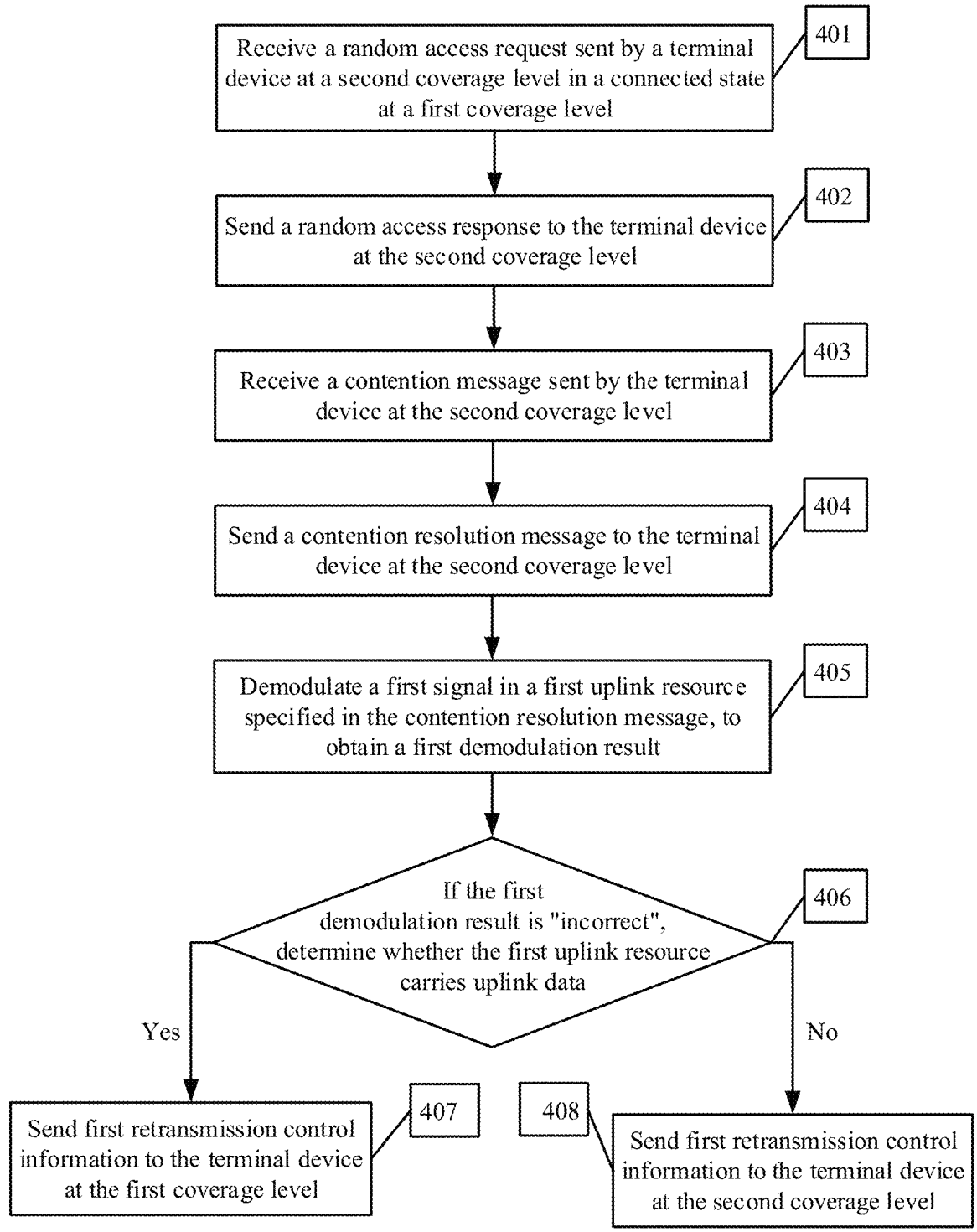
FIG. 4 is a schematic diagram of another embodiment of an uplink scheduling method according to this application.

An example in which the terminal device initiates contention random access to request an uplink resource is used. Referring to FIG. 4, another embodiment of the uplink scheduling method in this application includes the following steps.

401: A network device receives a random access request sent by a terminal device at a second coverage level in a connected state at a first coverage level.

402: The network device sends a random access response to the terminal device at the second coverage level.

403: The network device receives, at the second coverage level, a contention message sent by the terminal device.

404: The network device sends a contention resolution message to the terminal device at the second coverage level, where the contention resolution message includes information about a first uplink resource allocated to uplink data.

Step 401 to step 404 may be understood with reference to step 201 to step 204, and details are not described herein again.

405: The network device demodulates a first signal in the first uplink resource specified in the contention resolution message, to obtain a first demodulation result.

406: If the first demodulation result is "incorrect", the network device determines, based on the first demodulation result, whether the first uplink resource carries the uplink data, and if yes, triggers step 407, or if no, triggers step 408.

407: The network device sends first retransmission control information to the terminal device at the first coverage level.

408: The network device sends first retransmission control information to the terminal device at the second coverage level.

Step 405 to step 408 may be understood with reference to step 303 to step 306 in the embodiment corresponding to FIG. 3. Details are not described herein again.

Figure 5:
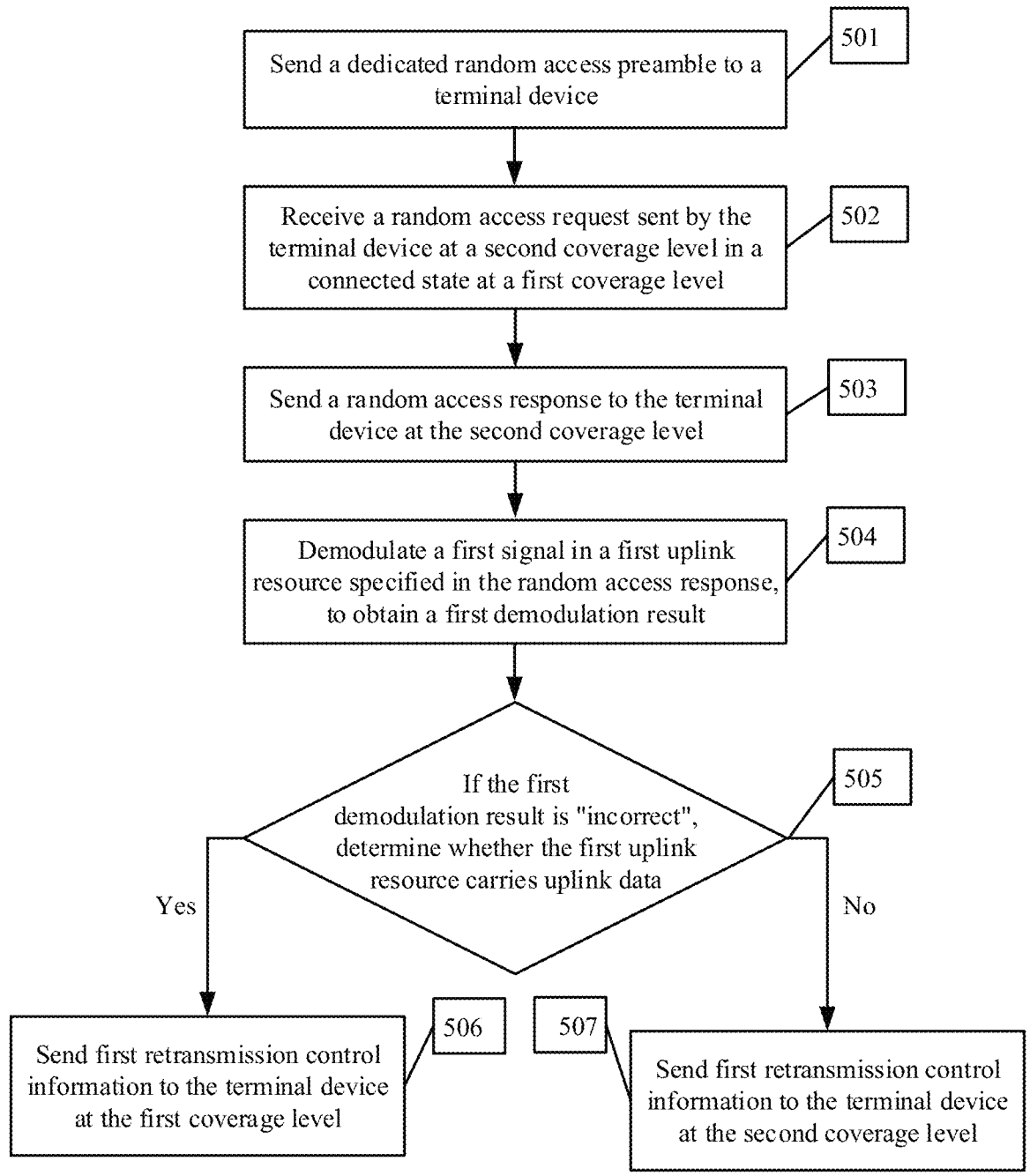
FIG. 5 is a schematic diagram of another embodiment of an uplink scheduling method according to this application.

An example in which the terminal device initiates non-contention random access to request an uplink resource is used. Referring to FIG. 5, another embodiment of the uplink scheduling method in this application includes the following steps.

501: A network device sends a dedicated random access preamble to a terminal device.

The network device may send a Msg0 to the terminal device, to allocate, to the terminal device, the dedicated random access preamble used for non-contention random access.

502: The network device receives a random access request sent by the terminal device at a second coverage level in a connected state at a first coverage level.

After receiving the dedicated random access preamble, if uplink data arrives and a coverage level needs to be switched, the terminal device can send the random access request to the network device at the second coverage level by using a Msg1. The random access request includes the dedicated random access preamble.

503: The network device sends a random access response to the terminal device at the second coverage level, where the random access response includes information about a first uplink resource allocated to the uplink data.

After receiving the random access request sent by the terminal device, the network device can send the random access response to the terminal device at the second coverage level by using a Msg2. The random access response includes the information about the first uplink resource allocated to the uplink data of the terminal device.

504: The network device demodulates a first signal in the first uplink resource specified in the random access response, to obtain a first demodulation result.

After sending the random access response, the network device can demodulate a signal (which is referred to as the first signal for ease of description) in the first uplink resource specified in the random access response, to obtain the first demodulation result. The first demodulation result may include a demodulated first signal and signal quality of the first signal. The signal quality includes, but is not limited to, an SNR and signal strength.

505: If the first demodulation result is "incorrect", the network device determines, based on the first demodulation result, whether the first uplink resource carries the uplink data, and if yes, triggers step 506, or if no, triggers step 507.

506: The network device sends first retransmission control information to the terminal device at the first coverage level.

507: The network device sends first retransmission control information to the terminal device at the second coverage level.

Step 504 to step 507 may be understood with reference to step 303 to step 306, and details are not described herein again. In the embodiment corresponding to FIG. 4, step 401 to step 404 correspond to the contention random access procedure. In the embodiment corresponding to FIG. 5, step 501 to step 503 are corresponding to the non-contention random access procedure.

In the embodiments corresponding to FIG. 3 to FIG. 5, only a first retransmission process is described. In actual application, after the network device sends the first retransmission control information to the terminal device, a second demodulation result obtained by the network device by demodulating a second uplink resource may still be "incorrect". Optionally, if the second demodulation result obtained by the network device by demodulating the second uplink resource is "incorrect", the network device can perform second retransmission, and send second retransmission control information to the terminal device at the first coverage level or the second coverage level. The second retransmission control information includes information about a third uplink resource allocated to the uplink data of the terminal device, and is used to indicate the terminal device to resend the uplink data on the third uplink resource.

TABLE 1

| After the information about the first uplink resource is sent | | | First retransmission | | | Second retransmission | |
|---|---|---|---|---|---|---|---|
| Receiving and sending of the terminal device | Coverage level at which the terminal device monitors downlink data | Whether the first uplink resource carries the uplink data | Coverage level at which the network device sends the first retransmission control information | Receiving and sending of the terminal device | Coverage level at which the terminal device monitors the downlink data | Whether the second uplink resource carries the uplink data | Coverage level at which the network device sends the second retransmission control information |
| The information about the first uplink resource is received and retransmitted as required | First coverage level | Yes | First coverage level | The first retransmission control information is received and retransmitted as required | First coverage level | Yes | First coverage level |
| | | | | The first retransmission control information is received, but not retransmitted as required | First coverage level | No | |
| | | | | No first retransmission control information is received | First coverage level | | |
| The information about the first uplink resource is received, but the uplink data is not sent as required | First coverage level | No | Second coverage level | No first retransmission control information is received | First coverage level | No | To be determined |
| No information about the first uplink resource is received, and no uplink data is sent | Second coverage level | | | The first retransmission control information is received and retransmitted as required | First coverage level | Yes | |
| | | | | The first retransmission control information is received, but not retransmitted as required | First coverage level | No | |
| | | | | No first retransmission control information is received | Second coverage level | | |

Table 1 is an analysis chart of data sending and receiving of the terminal device and the network device. The following can be learned from Table 1:

(1) After the terminal device sends the uplink data by using the first uplink resource, the network device may also determine that the first uplink resource does not carry the uplink data. For example, sending power is relatively low, and the signal quality of the first signal is excessively low. However, in actual application, a probability of this occurrence is generally low.

(2) If the network device determines that the first uplink resource carries the uplink data, after the network device sends the first retransmission control information at the first coverage level, if the second demodulation result is "incorrect", the terminal device monitors the downlink data at the first coverage level regardless of whether the second uplink resource carries the uplink data. Therefore, the network device should continue to send the second retransmission control information at the first coverage level, so that it is helpful for the terminal device to receive the second retransmission control information.

(3) If the network device determines that the first uplink resource does not carry the uplink data, after the network device sends the first retransmission control information at the second coverage level, if the second demodulation result is "incorrect", when it is determined that the second uplink resource carries the uplink data, the terminal device monitors the downlink data at the first coverage level. In this case, the network device should continue to send the second retransmission control information at the first coverage level, so that it is helpful for the terminal device to receive the second retransmission control information.

(4) If the network device determines that the first uplink resource does not carry the uplink data, after the network device sends the first retransmission control information at the second coverage level, if the second demodulation result is "incorrect", when it is determined that the second uplink resource carries the uplink data, the terminal device may monitor the downlink data at the first coverage level, or may monitor the downlink data at the second coverage level. In this case, the network device may monitor the downlink data at the first coverage level or the second coverage level.

According to the analysis of the foregoing results (1) to (4), the following provides two methods for sending retransmission control information by the network device in an $n^{th}$ retransmission process. n is an integer greater than or equal to 2.

For the case of (4), if a network method selects to send the retransmission control information at the first coverage level, in this case, a method A for sending the retransmission control information in the $n^{th}$ retransmission process may include the following steps.

Step A1: The network device receives and demodulates an $n^{th}$ signal in an $n^{th}$ uplink resource, to obtain an $n^{th}$ demodulation result.

The $n^{th}$ uplink resource is information about an uplink resource in retransmission control information that is sent by the network device during $(n-1)^{th}$ retransmission.

Step A2: If the $n^{th}$ demodulation result is "incorrect", the network device sends $n^{th}$ retransmission control information to the terminal device at the first coverage level.

The $n^{th}$ retransmission control information includes information about an $(n+1)^{th}$ uplink resource allocated to the uplink data, and is used to indicate the terminal device to resend the uplink data on the $(n+1)^{th}$ uplink resource.

For the case of (4), if a network method selects to send the retransmission control information at the second coverage level, in this case, a method B for sending the retransmission control information in the $n^{th}$ retransmission process may include the following steps.

Step B1: The network device receives and demodulates an $n^{th}$ signal in an $n^{th}$ uplink resource, to obtain an $n^{th}$ demodulation result.

The $n^{th}$ uplink resource is information about an uplink resource in retransmission control information that is sent by the network device during $(n-1)^{th}$ retransmission.

Step B2: If the $n^{th}$ demodulation result is "incorrect", the network device determines whether an $(n-1)^{th}$ uplink resource carries the uplink data.

The network device may determine, based on an $(n-1)^{th}$ demodulation result, whether the $(n-1)^{th}$ uplink resource carries the uplink data, or may store a determined determining result in the $(n-1)^{th}$ retransmission process, that is, a determining result of whether the $(n-1)^{th}$ uplink resource carries the uplink data. In an $n^{th}$ retransmission process, the determining result stored in the previous retransmission process may be directly obtained.

Step B3: If the $(n-1)^{th}$ uplink resource carries the uplink data, the network device sends $n^{th}$ retransmission control information to the terminal device at a first coverage level.

The $n^{th}$ retransmission control information includes information about an $(n+1)^{th}$ uplink resource allocated to the uplink data, and is used to indicate the terminal device to resend the uplink data on the $(n+1)^{th}$ uplink resource.

Step B4: If the $(n-1)^{th}$ uplink resource does not carry the uplink data, the network device determines, based on the $n^{th}$ demodulation result, whether the $n^{th}$ uplink resource carries the uplink data, and if yes, triggers step B5, or if no, triggers step B6.

Step B5: The network device sends the $n^{th}$ retransmission control information to the terminal device at the first coverage level.

Step B6: The network device sends the $n^{th}$ retransmission control information to the terminal device at the second coverage level.

Based on any embodiment corresponding to FIG. 3 to FIG. 5, in an $n^{th}$ (n is an integer greater than 1) retransmission process, the network device can send the $n^{th}$ retransmission control information by using the foregoing method A or method B, to indicate the terminal device to resend the uplink data on the $(n+1)^{th}$ uplink resource. In addition, a method used by the network device in the $n^{th}$ retransmission process may be different from a method used in an $(n+1)^{th}$ retransmission process.

Figure 6:
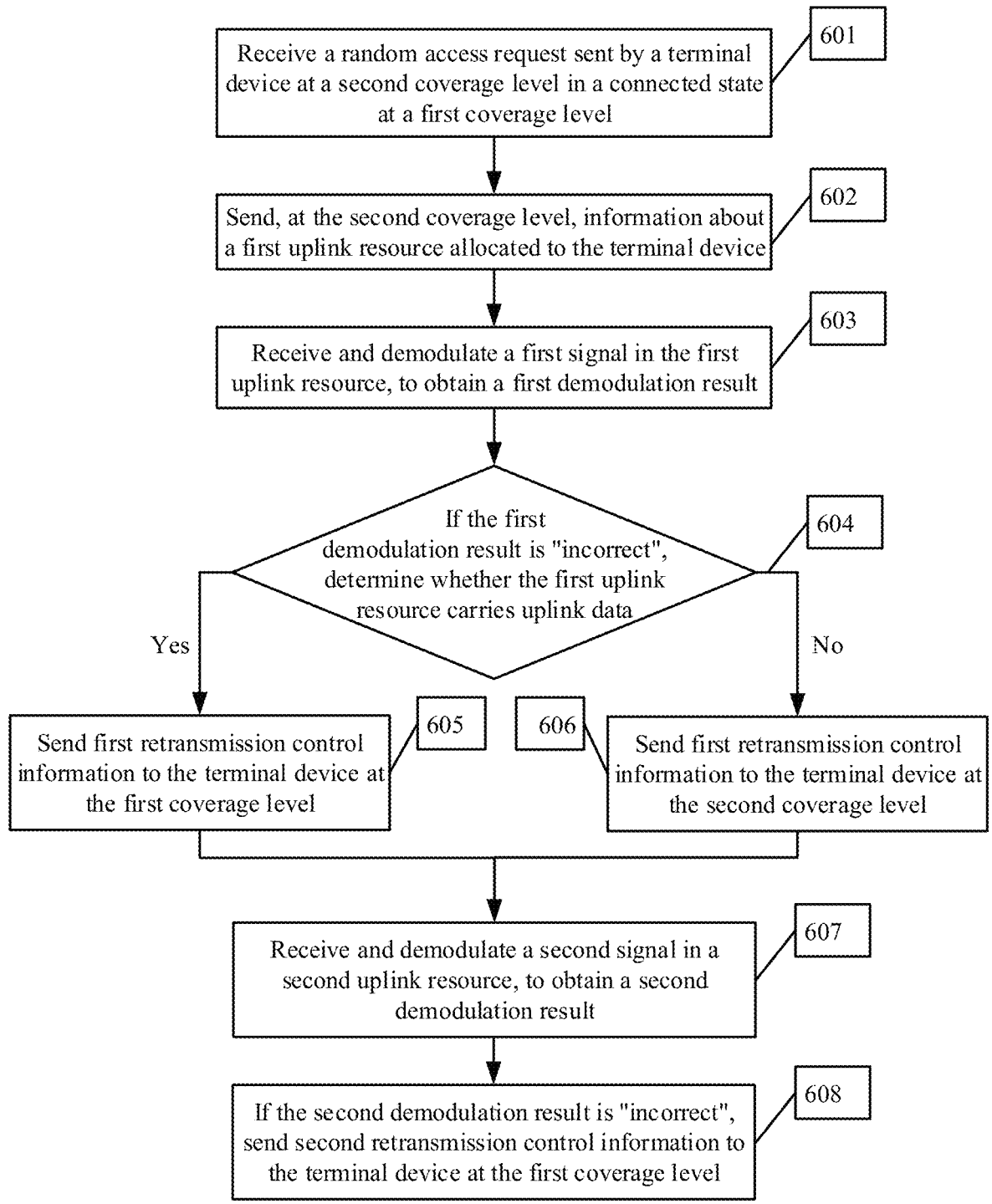
FIG. 6 is a schematic diagram of another embodiment of an uplink scheduling method according to this application.

The following describes another embodiment of the uplink scheduling method provided in this application by using an example in which the method A is used in a second retransmission process. Referring to FIG. 6, another embodiment of the uplink scheduling method provided in this application may include the following steps.

601: A network device receives a random access request sent by a terminal device at a second coverage level in a connected state at a first coverage level.

602: The network device sends, at the second coverage level, information about a first uplink resource allocated to the terminal device.

603: The network device receives and demodulates a first signal in the first uplink resource, to obtain a first demodulation result.

604: If the first demodulation result is "incorrect", the network device determines, based on the first demodulation result, whether the first uplink resource carries uplink data.

605: If yes, the network device sends first retransmission control information to the terminal device at the first coverage level.

606: If no, the network device sends first retransmission control information to the terminal device at the second coverage level.

For step 601 to step 606, refer to step 301 to step 306 in the embodiment corresponding to FIG. 3. Details are not described herein again.

607: The network device receives and demodulates a second signal in a second uplink resource, to obtain a second demodulation result.

608: If the second demodulation result is "incorrect", the network device sends second retransmission control information to the terminal device at the first coverage level.

The foregoing describes the method embodiments of this application, and the following describes apparatuses provided in this application.

The foregoing describes the method in the embodiments of this application. It may be understood that, to implement the foregoing functions, the network device includes a corresponding hardware structure and/or software module for performing each of the functions. A person skilled in the art should be easily aware that, in combination with functions described in the embodiments disclosed in this specification, this application may be implemented by hardware or a combination of hardware and computer software. Whether a function is performed by hardware or hardware driven by computer software depends on particular applications and design constraint conditions of the technical solutions. A person skilled in the art may use different methods to implement the described functions for each particular application, but it should not be considered that the implementation goes beyond the scope of this application.

Figure 7:
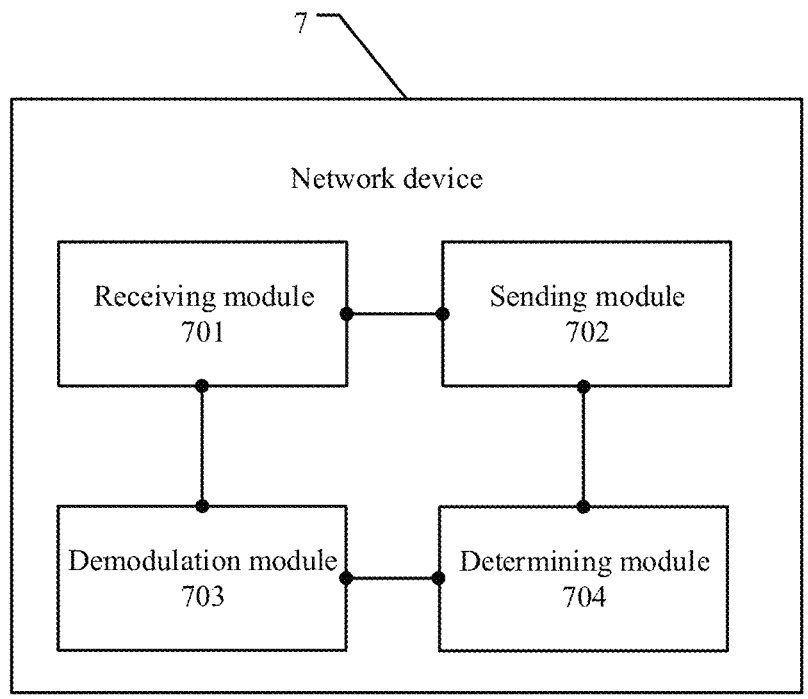
FIG. 7 is a schematic diagram of an embodiment of a network device according to this application.

In the foregoing method embodiments, from a functional perspective, the network device may be understood as an uplink scheduling apparatus, and the network device is configured to perform steps of the uplink scheduling method. In this application, the network device may be divided into functional units based on the foregoing method embodiments. For example, each functional unit may be obtained through division corresponding to each function, or two or more functions may be integrated into one functional unit. The integrated functional unit may be implemented in a form of hardware, or may be implemented in a form of a software functional unit. For example, when functional units are obtained in an integrated manner, FIG. 7 is a schematic diagram of a structure of an embodiment of a network device. As shown in FIG. 7, an embodiment of a network device 7 in this application may include:

a receiving module 701, configured to receive a random access request sent by a terminal device at a second coverage level, where the terminal device is in a connected state at a first coverage level;

a sending module 702, configured to send information about a first uplink resource to the terminal device at the second coverage level, to indicate the terminal device to send uplink data on the first uplink resource, where the receiving module 701 is further configured to receive a first signal in the first uplink resource;

a demodulation module 703, configured to demodulate the first signal that is in the first uplink resource and that is received by the receiving module 701, to obtain a first demodulation result; and a determining module 704, configured to: when the first demodulation result obtained by the demodulation module 703 is "incorrect", determine, based on the first demodulation result, whether the first uplink resource carries the uplink data, where the sending module 702 is further configured to: when the determining module 704 determines that the first uplink resource carries the uplink data, send first retransmission control information to the terminal device at the first coverage level, where the first retransmission control information is used to indicate the terminal device to resend the uplink data on the second uplink resource; and the sending module 702 is further configured to: when the determining module 704 determines that the first uplink resource does not carry the uplink data, send the first retransmission control information to the terminal device at the second coverage level.

In a possible implementation, the determining module 704 may be specifically configured to: determine whether signal quality of the first signal is higher than a threshold, and when the signal quality of the first signal is higher than the threshold, determine that the first uplink resource carries the uplink data, or when the signal quality of the first signal is lower than the threshold, determine that the first uplink resource does not carry the uplink data.

In a possible implementation, a first coverage level corresponds to normal coverage, and a second coverage level corresponds to enhanced coverage.

In a possible implementation, the sending module 702 is further configured to: after the receiving module 701 receives the random access request sent by the terminal device at the second coverage level, send a random access response to the terminal device at the second coverage level.

The receiving module 701 is further configured to receive, at the second coverage level, a contention message sent by the terminal device, where the contention message includes identification information of the terminal device.

The sending module 702 is further configured to: after the receiving module 701 receives, at the second coverage level, the contention message sent by the terminal device, send a contention resolution message to the terminal device at the second coverage level, where the contention resolution message includes the information about a first uplink resource.

In a possible implementation, the receiving module 701 is further configured to: after the sending module 702 sends $(n-1)^{th}$ retransmission control information to the terminal device, receive an $n^{th}$ signal in an $n^{th}$ uplink resource, where the $(n-1)^{th}$ retransmission control information is used to indicate the terminal device to resend uplink data on the $n^{th}$ uplink resource, and n is an integer greater than 1.

The demodulation module 703 is further configured to: after the receiving module 701 receives the $n^{th}$ signal, demodulate the $n^{th}$ signal to obtain an $n^{th}$ demodulation result.

The sending module 702 is further configured to: when the $n^{th}$ demodulation result obtained by the demodulation module 703 is "incorrect", send $n^{th}$ retransmission control information to the terminal device at a first coverage level, where the $n^{th}$ retransmission control information is used to indicate the terminal device to resend the uplink data on an $(n+1)^{th}$ uplink resource.

In a possible implementation, the receiving module 701 is further configured to: after the sending module 702 sends $(n-1)^{th}$ retransmission control information to the terminal device, receive an $n^{th}$ signal in an $n^{th}$ uplink resource, where the $(n-1)^{th}$ retransmission control information is used to indicate the terminal device to resend the uplink data on the $n^{th}$ uplink resource, and n is an integer greater than 1.

The demodulation module 703 is further configured to: after the receiving module 701 receives the $n^{th}$ signal, demodulate the $n^{th}$ signal to obtain an $n^{th}$ demodulation result.

The determining module 704 is further configured to: when the $n^{th}$ demodulation result obtained by the demodulation module 703 is "incorrect", determine whether an $(n-1)^{th}$ uplink resource carries the uplink data.

The sending module 702 is further configured to: when the determining module 704 determines that the $(n-1)^{th}$ uplink resource carries the uplink data, send $n^{th}$ retransmission control information to the terminal device at a first coverage level, where the $n^{th}$ retransmission control information is used to indicate the terminal device to resend the uplink data on an $(n+1)^{th}$ uplink resource.

The determining module 704 is further configured to: when the $(n-1)^{th}$ uplink resource does not carry the uplink data, determine, based on the $n^{th}$ demodulation result, whether the $n^{th}$ uplink resource carries the uplink data.

The sending module 702 is further configured to: when the determining module 704 determines that the $n^{th}$ uplink resource carries the uplink data, send $n^{th}$ retransmission control information to the terminal device at the first coverage level, or when the determining module determines that the $n^{th}$ uplink resource does not carry the uplink data, send the $n^{th}$ retransmission control information to the terminal device at the second coverage level.

Because the network device provided in the embodiments of this application may be configured to perform the method in the embodiments of this application, for technical effects that can be achieved by the functional apparatus embodiments of this application, refer to the foregoing corresponding method embodiments. Details are not described herein again.

From a perspective of an entity device, the network device in the methods in the foregoing embodiments may be implemented by one entity device, for example, a base station, or may be jointly implemented by a plurality of entity devices, or may be a logical functional unit in one entity device. This is not specifically limited in the embodiments of this application.

Figure 8:
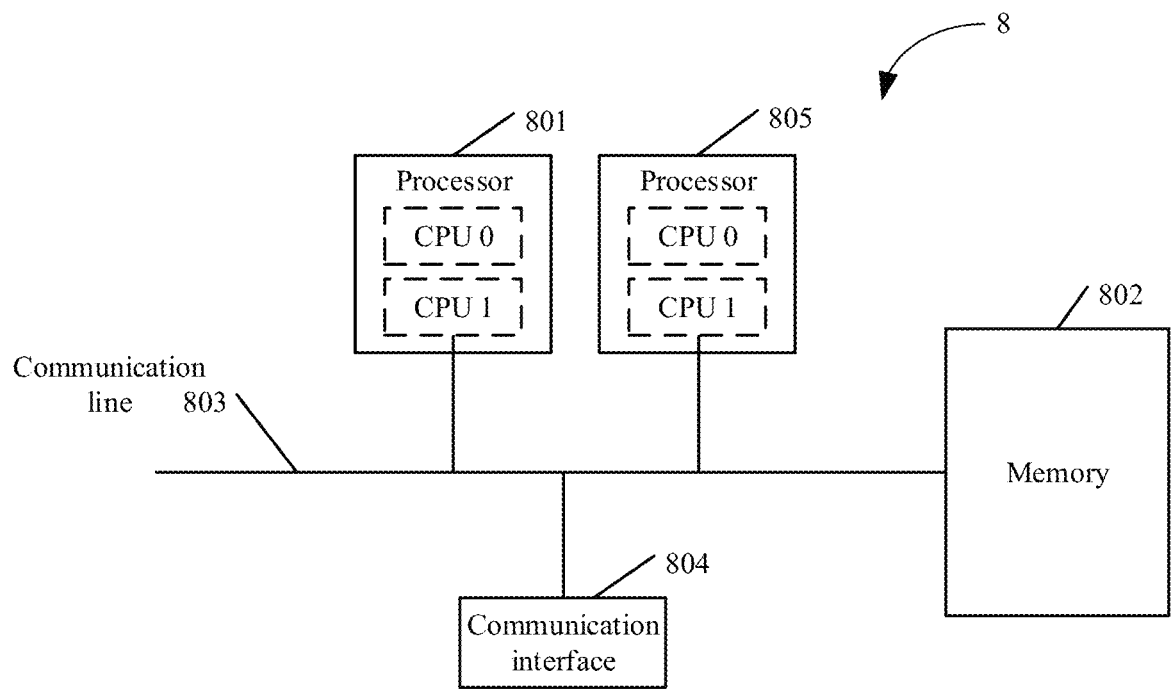
FIG. 8 is a schematic diagram of a hardware structure of a network device according to this application.

For example, the network device may be implemented by a network device in FIG. 8. FIG. 8 is a schematic diagram of a hardware structure of a network device according to an embodiment of this application. The network device includes at least one processor 801, a memory 802, a communication line 803, and at least one communication interface 804.

The processor 801 may be a general-purpose central processing unit (central processing unit, CPU), a microprocessor, an application-specific integrated circuit (application-specific integrated circuit, server IC), or one or more integrated circuits configured to control execution of programs in the solutions of this application.

The communication line 803 may include a path for transmitting information between the foregoing components.

The memory 802 may be a read-only memory (read-only memory, ROM), another type of static storage device capable of storing static information and instructions, a random access memory (random access memory, RAM), or another type of dynamic storage device capable of storing information and instructions, or may be an electrically erasable programmable read-only memory (electrically erasable programmable read-only memory, EEPROM), a compact disc read-only memory (compact disc read-only memory, CD-ROM), another compact disc storage, an optical disc storage (including a compressed optical disc, a laser disc, an optical disc, a digital versatile disc, a Blu-ray optical disc, and the like), a magnetic disk storage medium, another magnetic storage device, or any other medium capable of carrying or storing expected program code in a form of instructions or data structures and capable of being accessed by a computer, but the memory is not limited thereto. The memory may exist independently, and is connected to the processor 801 by using the communication line 803. Alternatively, the memory 802 may be integrated with the processor 801.

The memory 802 is configured to store computer-executable instructions for executing the solutions of this application, and the processor 801 controls the execution. The processor 801 is configured to execute the computer-executable instructions stored in the memory 802, to implement the method in the foregoing embodiments of this application.

The communication line 803 may include a path transmitting information between the foregoing components.

The communication interface 804 uses any apparatus such as a transceiver, to communicate with another device or a communication network, for example, the Ethernet, a radio access network (radio access network, RAN), or a wireless local area network (wireless local area network, WLAN).

In a possible implementation, the computer-executable instructions in the embodiments of this application may also be referred to as application program code. This is not specifically limited in the embodiments of this application.

In specific implementation, in an embodiment, the processor 801 may include one or more CPUs, for example, a CPU 0 and a CPU 1 in FIG. 8.

In specific implementation, in an embodiment, the computer apparatus may include a plurality of processors, for example, the processor 801 and a processor 805 in FIG. 8. Each of the processors may be a single-core (single-CPU) processor, or may be a multi-core (multi-CPU) processor. The processor herein may be one or more devices, circuits, and/or processing cores for processing data (for example, computer-executable instructions).

All or some of the foregoing method embodiments may be implemented by using software, hardware, firmware, or any combination thereof. When the software is used for implementation, all or some of the method embodiments may be implemented in a form of a computer program product.

The computer program product includes one or more computer-executable instructions. When the computer-executable instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

The term "and/or" in this application may be an association relationship for describing associated objects, and may indicate three relationships. For example, A and/or B may indicate the following cases: Only A exists, both A and B exist, and only B exists, where A and B may be singular or plural. In addition, the character "/" in this application generally indicates an "or" relationship between the associated objects. In this application, "at least one" means one or more, and "a plurality of" means two or more. "At least one of the following items (pieces)" or a similar expression thereof means any combination of these items, including a singular item (piece) or any combination of plural items (pieces). For example, at least one of a, b, or c may indicate: a, b, c, a and b, a and c, b and c, or a, b, and c, where a, b, and c may be singular or plural.

In the specification, claims, and the accompanying drawings of this application, the terms "first", "second", and the like are intended to distinguish between similar objects but do not necessarily indicate a specific order or sequence. It should be understood that the terms used in such a way are interchangeable in proper cases. This is merely a manner of distinguishing between objects with a same attribute in the embodiments of this application. In addition, the terms "include", "have", and any other variations thereof are intended to cover the non-exclusive inclusion, so that a process, method, system, product, or device that includes a series of units is not limited to those units, but may include other units not expressly listed or inherent to such a process, method, product, or device.

The technical solutions provided in this application are described in detail above. The principle and implementation of this application are described herein through specific examples. The description about the embodiments is merely provided to help understand the method and core ideas of this application. In addition, a person of ordinary skill in the art can make variations and modifications to this application in terms of specific implementations and application scopes according to the ideas of this application. Therefore, content of the specification shall not be construed as a limit to this application.

What is claimed is:

1. An uplink scheduling method, comprising:
   receiving, by a network device, a random access request sent by a terminal device at a second coverage level, wherein the terminal device is in a connected state at a first coverage level;
   sending, by the network device, information about a first uplink resource to the terminal device at the second coverage level, to indicate the terminal device to send uplink data on the first uplink resource;
   receiving and demodulating, by the network device, a first signal in the first uplink resource, to obtain a first demodulation result;
   in response to the first demodulation result indicating a demodulation failure,
      determining, by the network device based on the first demodulation result, whether the first uplink resource carries the uplink data; and
      in response to determining that the first uplink resource carries the uplink data, sending, by the network device, first retransmission control information to the terminal device at the first coverage level, wherein the first retransmission control information is used to indicate the terminal device to resend the uplink data on a second uplink resource; or
      in response to determining that the first uplink resource does not carry the uplink data, sending, by the network device, the first retransmission control information to the terminal device at the second coverage level;
   after the network device sends (n−1)th retransmission control information to the terminal device, receiving and demodulating, by the network device, an $n^{th}$ signal in an $n^{th}$ uplink resource to obtain an $n^{th}$ demodulation result, wherein the $(n-1)^{th}$ retransmission control information is used to indicate the terminal device to resend the uplink data on the $n^{th}$ uplink resource, and n is an integer greater than 1; and
   in response to the $n^{th}$ demodulation result indicating a demodulation failure, sending, by the network device, $n^{th}$ retransmission control information to the terminal device at the first coverage level, wherein the $n^{th}$ retransmission control information is used to indicate the terminal device to resend the uplink data on an $(n+1)^{th}$ uplink resource.

2. The method according to claim 1, wherein the determining, by the network device based on the first demodulation result, whether the first uplink resource carries the uplink data comprises:
   determining whether signal quality of the first signal is higher than a threshold; and
   in response to determining that the signal quality of the first signal is higher than the threshold, determining that the first uplink resource carries the uplink data; or
   in response to determining that the signal quality of the first signal is lower than the threshold, determining that the first uplink resource does not carry the uplink data.

3. The method according to claim 1, wherein the first coverage level corresponds to normal coverage, and the second coverage level corresponds to enhanced coverage.

4. The method according to claim 1, wherein after the receiving, by a network device, a random access request sent by a terminal device at a second coverage level, and before the sending, by the network device, information about a first uplink resource to the terminal device at the second coverage level, the method further comprises:
   sending, by the network device, a random access response to the terminal device at the second coverage level; and
   receiving, by the network device at the second coverage level, a contention message sent by the terminal device, wherein the contention message comprises identification information of the terminal device; and
   wherein the sending, by the network device, information about a first uplink resource to the terminal device at the second coverage level comprises:
   sending, by the network device, a contention resolution message to the terminal device at the second coverage level, wherein the contention resolution message comprises the information about the first uplink resource.

5. An uplink scheduling apparatus, comprising at least one processor, and one or more memories couple to the at least one processor, wherein the one or more memories store programming instructions for execution by the at least one processor to cause the apparatus to:

receive a random access request sent by a terminal device at a second coverage level, wherein the terminal device is in a connected state at a first coverage level;

send information about a first uplink resource to the terminal device at the second coverage level, to indicate the terminal device to send uplink data on the first uplink resource;

receive a first signal in the first uplink resource;

demodulate the first signal that is in the first uplink resource to obtain a first demodulation result;

in response to the first demodulation result obtained indicating a demodulation failure, determine, based on the first demodulation result, whether the first uplink resource carries the uplink data;

in response to determining that the first uplink resource carries the uplink data, send first retransmission control information to the terminal device at the first coverage level, wherein the first retransmission control information is used to indicate the terminal device to resend the uplink data on a second uplink resource; or in response to determining that the first uplink resource does not carry the uplink data, send the first retransmission control information to the terminal device at the second coverage level;

after sending $(n-1)^{th}$ retransmission control information to the terminal device, receive an $n^{th}$ signal in an $n^{th}$ uplink resource, wherein the $(n-1)^{th}$ retransmission control information is used to indicate the terminal device to resend the uplink data on the $n^{th}$ uplink resource, and n is an integer greater than 1;

after receiving the $n^{th}$ signal, demodulate the $n^{th}$ signal to obtain an $n^{th}$ demodulation result; and in response to the $n^{th}$ demodulation result obtained indicating a demodulation failure, send $n^{th}$ retransmission control information to the terminal device at the first coverage level, wherein the $n^{th}$ retransmission control information is used to indicate the terminal device to resend the uplink data on an $(n+1)^{th}$ uplink resource.

6. The apparatus according to claim 5, wherein the programming instructions, when executed by the at least one processor, cause the apparatus to:

determine whether signal quality of the first signal is higher than a threshold; and in response to the signal quality of the first signal is higher than the threshold, determine that the first uplink resource carries the uplink data; or in response to the signal quality of the first signal is lower than the threshold, determine that the first uplink resource does not carry the uplink data.

7. The apparatus according to claim 5, wherein the first coverage level corresponds to normal coverage, and the second coverage level corresponds to enhanced coverage.

8. The apparatus according to claim 5, wherein the programming instructions, when executed by the at least one processor, cause the apparatus to:

after receiving the random access request sent by the terminal device at the second coverage level, send a random access response to the terminal device at the second coverage level;

receive, at the second coverage level, a contention message sent by the terminal device, wherein the contention message comprises identification information of the terminal device; and after the receiving, at the second coverage level, the contention message sent by the terminal device, send a contention resolution message to the terminal device at the second coverage level, wherein the contention resolution message comprises the information about the first uplink resource.

9. A non-transitory computer-readable medium storing one or more instructions executable by at least one processor to perform operations comprising:

receiving a random access request sent by a terminal device at a second coverage level, wherein the terminal device is in a connected state at a first coverage level;

sending information about a first uplink resource to the terminal device at the second coverage level, to indicate the terminal device to send uplink data on the first uplink resource;

receiving and demodulating a first signal in the first uplink resource, to obtain a first demodulation result;

in response to the first demodulation result indicating a demodulation failure, determining, based on the first demodulation result, whether the first uplink resource carries the uplink data; and in response to determining that the first uplink resource carries the uplink data, sending first retransmission control information to the terminal device at the first coverage level, wherein the first retransmission control information is used to indicate the terminal device to resend the uplink data on a second uplink resource; or in response to determining that the first uplink resource does not carry the uplink data, sending the first retransmission control information to the terminal device at the second coverage level;

after sending $(n-1)^{th}$ retransmission control information to the terminal device, receiving and demodulating an $n^{th}$ signal in an $n^{th}$ uplink resource to obtain an $n^{th}$ demodulation result, wherein the $(n-1)^{th}$ retransmission control information is used to indicate the terminal device to resend the uplink data on the $n^{th}$ uplink resource, and n is an integer greater than 1;

in response to the $n^{th}$ demodulation result indicates a demodulation failure, determining, whether an $(n-1)^{th}$ uplink resource carries the uplink data; and in response to the $(n-1)^{th}$ uplink resource carrying the uplink data, sending $n^{th}$ retransmission control information to the terminal device at the first coverage level, wherein the $n^{th}$ retransmission control information is used to indicate the terminal device to resend the uplink data on an $(n+1)^{th}$ uplink resource; or in response to the $(n-1)^{th}$ uplink resource does not carry the uplink data, determining, based on the $n^{th}$ demodulation result, whether the $n^{th}$ uplink resource carries the uplink data; and in response to the $n^{th}$ uplink resource carrying the uplink data, sending the $n^{th}$ retransmission control information to the terminal device at the first coverage level; or in response to the $n^{th}$ uplink resource does not carry the uplink data, sending the $n^{th}$ retransmission control information to the terminal device at the second coverage level.

10. The non-transitory computer-readable medium according to claim 9, wherein the determining, based on the first demodulation result, whether the first uplink resource carries the uplink data comprises:

determining whether signal quality of the first signal is higher than a threshold; and in response to determining that the signal quality of the first signal is higher than the threshold, determining that the first uplink resource carries the uplink data; or in response to determining that the signal quality of the first signal is lower than the threshold, determining that the first uplink resource does not carry the uplink data.

11. The non-transitory computer-readable medium according to claim 9, wherein the first coverage level corresponds to normal coverage, and the second coverage level corresponds to enhanced coverage.

12. The non-transitory computer-readable medium according to claim 9, wherein after the receiving, a random access request sent by a terminal device at a second coverage level, and before the sending, information about a first uplink resource to the terminal device at the second coverage level, the operations further comprise:

sending, a random access response to the terminal device at the second coverage level; and receiving, at the second coverage level, a contention message sent by the terminal device, wherein the contention message comprises identification information of the terminal device; and wherein the sending, information about a first uplink resource to the terminal device at the second coverage level comprises:

sending, a contention resolution message to the terminal device at the second coverage level, wherein the contention resolution message comprises the information about the first uplink resource.

\* \* \* \* \*

UNITED STATES PATENT AND TRADEMARK OFFICE
CERTIFICATE OF CORRECTION

| | | |
|---|---|---|
| PATENT NO. | : 12,101,764 B2 | Page 1 of 1 |
| APPLICATION NO. | : 17/538848 | |
| DATED | : September 24, 2024 | |
| INVENTOR(S) | : Hai Huang | |

It is certified that error appears in the above-identified patent and that said Letters Patent is hereby corrected as shown below:

On the Title Page

In Column 2 item (56) (Other Publications), In Line 2, Delete "Title :" and insert -- Title: --.

In the Claims

In Column 22, In Line 11(Approx.), In Claim 1, delete "(n-1)th" and insert -- $(n-1)^{th}$ --.

Signed and Sealed this
Seventeenth Day of December, 2024

Derrick Brent
*Acting Director of the United States Patent and Trademark Office*